Apr. 17, 1923.  
J. G. BAILEY  
MANURE SPREADER  
Filed March 31, 1922  
1,452,139  
3 Sheets-Sheet 1
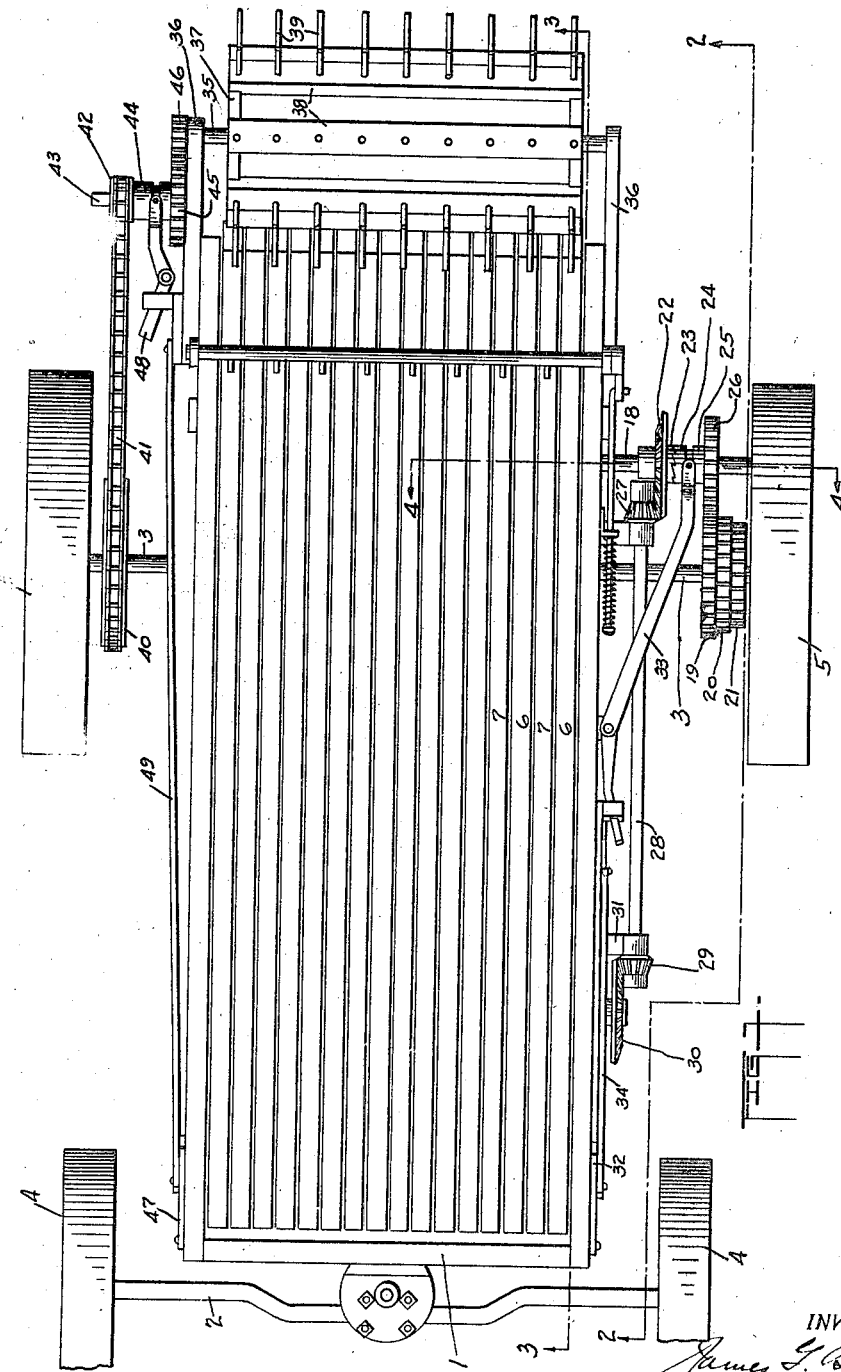
INVENTOR.
James G. Bailey
ATTORNEYS.

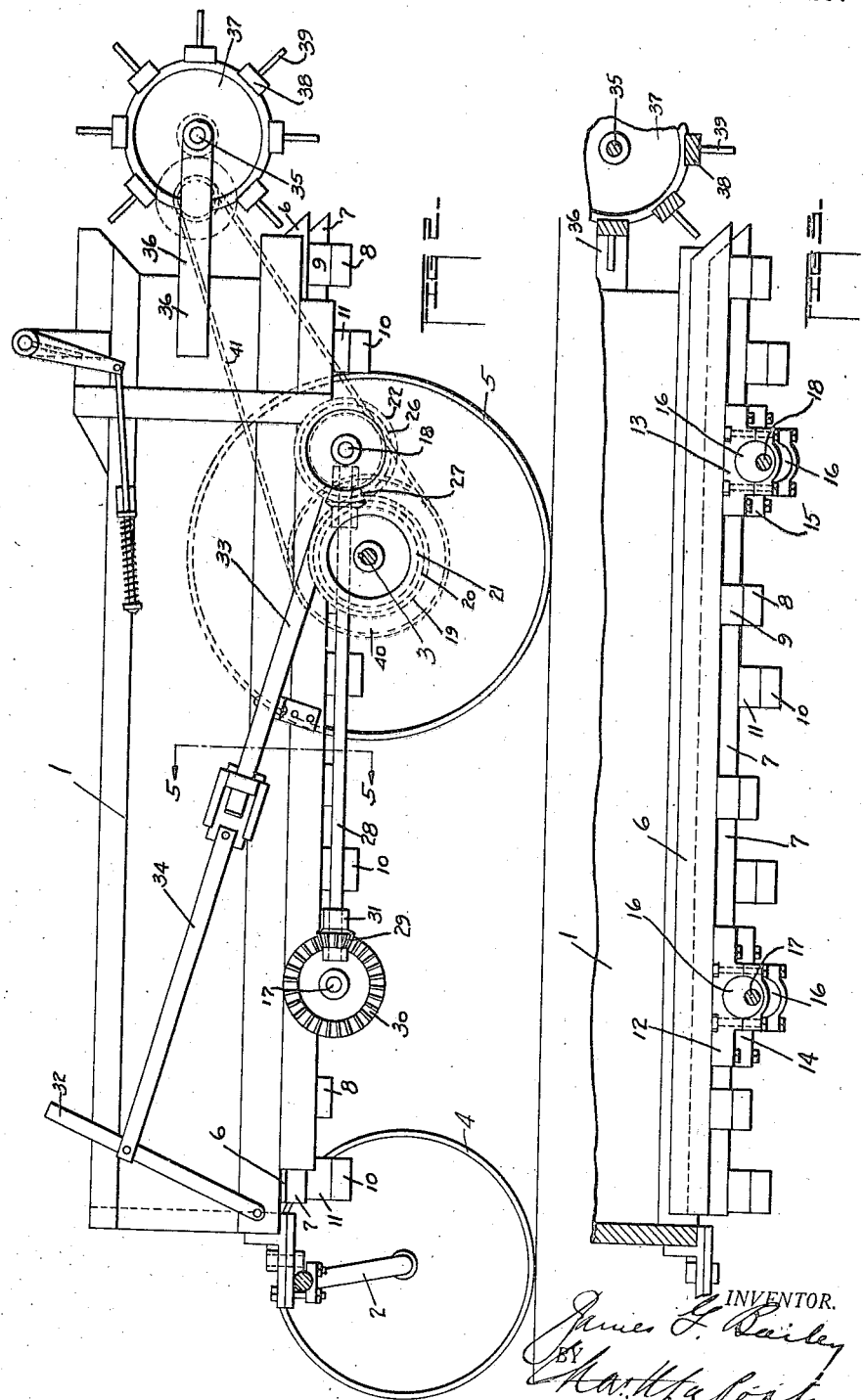

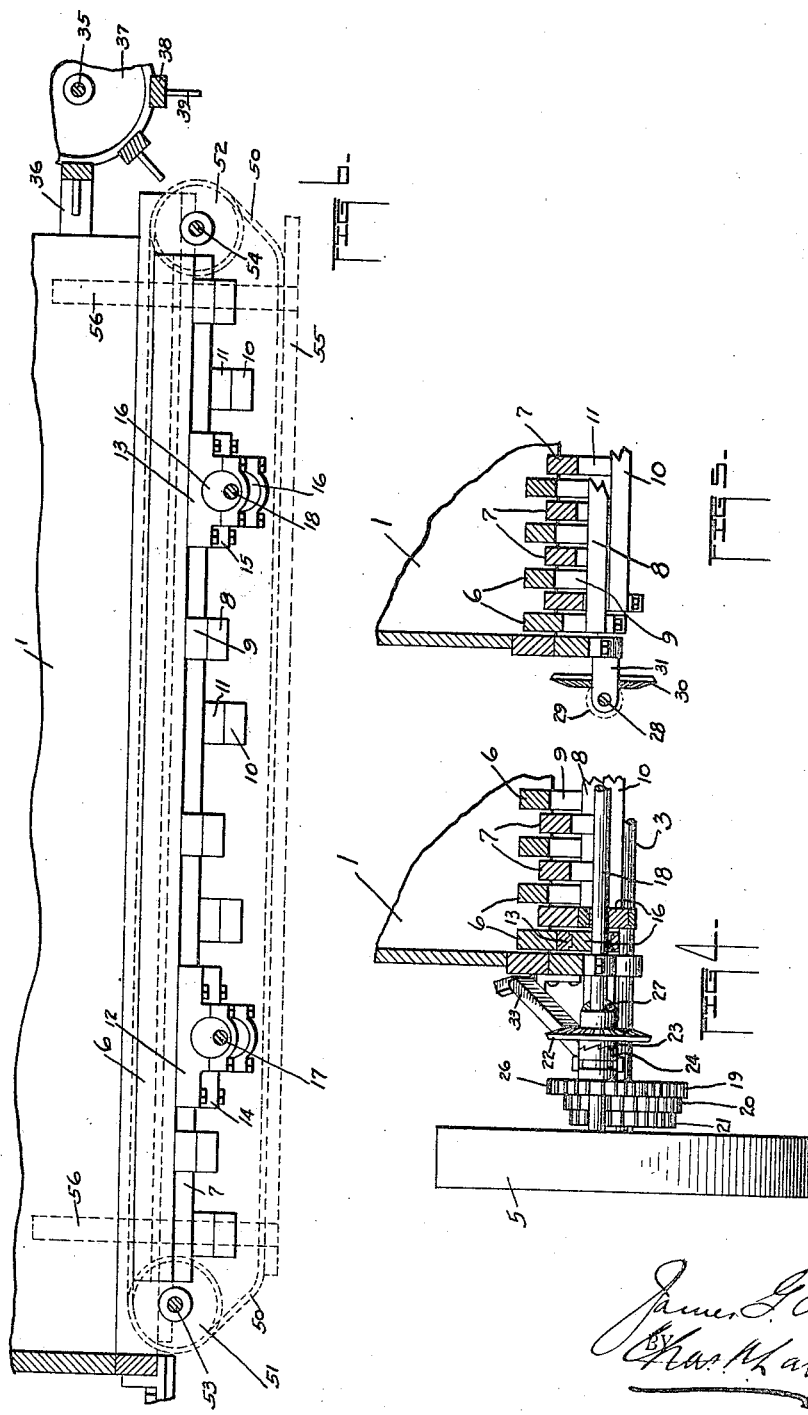

Patented Apr. 17, 1923.

1,452,139

UNITED STATES PATENT OFFICE.

JAMES G. BAILEY, OF DELAVAN, ILLINOIS, ASSIGNOR TO ROTARY SPREADER, OF MASON CITY, ILLINOIS, A CORPORATION OF ILLINOIS.

MANURE SPREADER.

Application filed March 31, 1922. Serial No. 548,330.

*To all whom it may concern:*

Be it known that I, JAMES G. BAILEY, a citizen of the United States, a resident of Delavan, in the county of Tazewell and State of Illinois, have invented new and useful Improvements in Manure Spreaders, of which the following is a specification.

This invention has reference to manure spreaders, although the apparatus may be found useful for other and similar uses.

The invention has for its principal object to improve the feeding means, whereby the manure can be evenly and gradually delivered to the spreading means. Said feeding means is also designed to agitate and break any manure clogs in the manure mass, so as to insure the manure being spread in an even sheet over the ground.

The invention comprehends a vehicle body provided with a bed which preferably includes a plurality of boards arranged alongside each other and in two sets or series; the alternate boards constituting one of each set or series, and each set or series of boards connected with an eccentric mechanism for imparting motion to said boards for moving the mass of manure to the spreading means.

The invention further comprehends an endless draper or conveyer, which may include any suitable cross slots or flights or merely a simple belt upon which the greater mass of manure or other material may ride. Said draper or conveyer is arranged to be moved to deliver the material to the spreading means by engagement of the sets or series of boards therewith.

That the invention may be more fully understood, reference is had to the accompanying drawings, forming a part of this description, illustrating a preferred embodiment of the invention, in which:—

Figure 1 is a plan view of a machine embodying my invention;

Figure 2 is a side elevation of the machine, partly in section, as the same would appear, if taken on the line 2—2 Figure 1;

Figure 3 is a longitudinal sectional view through the machine, as the same would appear, if taken on the line 3—3 Figure 1;

Figure 4 is a detail section in elevation of parts which would appear in a section taken on the line 4—4 Figure 1;

Figure 5 is a sectional detail somewhat similar to Figure 4, as the same would appear, if taken on the line 5—5 Figure 2, and Figure 6 is a view similar to Figure 3, except there is shown in dotted lines the endless draper or conveyer coacting with the sets or series of boards.

Like characters of reference denote corresponding parts throughout the figures.

In the drawings a vehicle body 1 is shown mounted on front and rear axles 2 and 3 to which are connected the ground wheels 4 and 5 respectively. The bed of the vehicle comprises a plurality of boards 6 and 7 arranged on edge and alongside each other, the boards extending from end to end of the vehicle body and preferably in two sets or series. The boards 6 constitute one set or series and the alternate boards 7 constitute the other set or series. The boards 6 of one set or series are connected to each other through and by means of cross bars 8 and spacer blocks 9; whereas the boards 7 of the other set or series are connected to each other through and by means of cross bars 10 and spacer blocks 11, see Figures 3, 4 and 5.

To the under sides of one pair of boards 6 of one set or series of boards and at or near their front and rear ends are secured bearing blocks 12 and 13, and to the under sides of one pair of the boards 7 of the other set or series of boards and at or near their front and rear ends are secured bearing blocks 14 and 15, and in said blocks are journaled eccentric straps 16 connected by the transversely disposed shafts 17 and 18. The eccentrics 16 associated with the set or series of boards 6 are in staggered arrangement to the eccentrics associated with the set or series of boards 7, whereby when one set or series of boards are raised the other set or series of boards are lowered, as in Figures 4 and 5. The action of the eccentrics is to raise and lower the sets or series of boards and to impart slight reciprocal movement thereto. The alternate raising and lowering of said sets or series of boards is to constantly agitate the mass of manure or fertilizing material which will tend to separate and break up any existing clogs, or in other words tend to pulverize the same, while the reciprocal or endwise movement of the boards 6 and 7 will feed the mass of material to the spreader means at the rear of the vehicle.

The shafts 17 and 18 are preferably operated from the axle 3. On said axle are carried, preferably a plurality of gear wheels 19, 20 and 21, the object of which is to provide a selective drive for the shaft 18 and the shaft 17. On the shaft 18 is loosely carried a bevel gear wheel 22 having a clutch face 23 adapted to be engaged by a clutch face 24 on a grooved sleeve 25 having a spline and groove connection with the shaft 18 whereby it may be moved back and forth thereon, and to said sleeve 25 is connected a gear wheel 26, which, in this instance is shown meshing with the gear wheel 19 on the axle 3. By providing the axle 3 with the gear wheels 19, 20 and 21 and then by providing the sleeve 25 with a gear wheel 26 of suitable diameter, the purchaser may select the speed of operation he may desire by the size of the gear wheel 26 to mesh with either of the gear wheels 19, 20 and 21, as will be understood. The bevel gear wheel 22 has meshing therewith a bevel pinion 27 on the rear end of a shaft 28 disposed longitudinally of and alongside the vehicle body, and on the forward end of said shaft 28 is a bevel pinion 29 meshing with a bevel gear wheel 30 on the shaft 17. Said shaft 28 is journaled in suitable bearings 31 secured to the bed. The operator or attendant has full control of the sleeve 25 and the gear wheel 26 by the usual control mechanism, including the hand lever 32, shifting lever 33 and connecting bar 34, the operation of which is well understood.

The spreading means is not unlike those which have been in general use, and includes a shaft 35 journaled in suitable bearings or brackets 36 secured to and extending rearwardly from the vehicle body, see Figures 1 and 2. On said shaft are heads 37 and said heads are connected by a plurality of spaced bars 38 provided with a plurality of picking fingers or rods 39, which, during the rotation of the shaft 35 pick at the manure mass fed thereto by the sets of bars 6 and 7, and cause the manure to be spread over the ground. The spreading means, as illustrated in Figure 2 is located in close proximity to the rear ends of the bars 6 and 7, leaving only sufficient clearance for the endwise movement of said bars 6 and 7. The operating means for the spreading means includes a sprocket wheel 40 secured to the axle 3 and said sprocket wheel drives a chain 41 engaging a sprocket pinion 42 on a shaft 43. The pinion is provided with a grooved sleeve 44 to which is connected a gear wheel 45 meshing with a pinion 46 on the shaft 35 of the spreading means. The sleeve 44 with its sprocket pinion and gear wheel have a spline and groove connection with the shaft 43 so as to be moved back and forth thereon and control the operation of the spreading means. The control means for the sleeve 44 is similar to the control means for the sleeve 25, and includes a hand lever 47, a shifting lever 48 and a connecting bar 49.

The endless draper or conveyer referred to, which may or not be provided with the machine, depending largely on trade conditions, is designated 50, Figure 6 and may include any suitable cross slats or flights, not shown, or merely a simple belt upon which the greater mass of manure or other material may ride. Said conveyer or draper is guided over idlers 51 and 52, respectively, at the forward and rear ends of the machine, the former connected with a shaft 53 and the latter connected with a shaft 54 journaled in any suitable bearing supports. The lower run of the conveyer or draper moves on a supporting rest 55 suspended by supports 56 connected with the side of the machine and is actuated by the contact of the sets or series of boards therewith during the alternate up and down and longitudinal movement of said boards.

It will be at once apparent that modifications of the structure may be made without departing from the spirit and scope of the invention, and I, therefore, do not wish to be limited to the disclosure except as expressed in the appended claims.

What I claim is:—

1. In a manure spreader, in combination, a vehicle including a box-like body, a movable bottom for said body comprising a plurality of parallel arranged boards extending approximately the length of the body, the alternately disposed boards constituting separate sets or series of boards, each set or series movable in unison, cross-shafts arranged at or near the forward and rear ends of said boards, connections between each shaft and each series or set of boards to impart alternate up and down and longitudinal movement to said sets or series of boards, a driving means, gearing connecting said driving means with one cross-shaft, and gearing connecting said cross-shafts with each other whereby one is driven from the other.

2. In a manure spreader, in combination with a box-like body provided with scattering means at the scattering end thereof, of a movable bottom for said body comprising a plurality of parallel arranged boards extending approximately the length of the body, the alternately disposed boards constituting separate sets or series of boards, each set or series movable in unison, cross-shafts arranged at or near the forward and rear end of said boards, connections between each shaft and each series or set of boards to impart alternate up and down and longitudinal movement to said sets or series of boards, a driving means, gearing connecting said driving means with one cross-shaft, and gearing connecting said cross-shafts with each other whereby one is driven from the other.

3. In a manure spreader, in combination, a vehicle including a box-like body, a movable bottom for said body comprising a plurality of parallel arranged boards extending approximately the length of the body, the alternately disposed boards constituting separate sets or series of boards, each set or series movable in unison, cross-shafts arranged at or near the forward and rear ends of said boards, connections between each shaft and each series or set of boards to impart alternate up and down and longitudinal movement to said sets or series of boards, a driving means, selective speed changing gearing between said driving means and one cross-shaft, and gearing connecting said cross-shafts with each other whereby one is driven from the other.

4. In a manure spreader, in combination, a vehicle including a box-like body, a movable bottom for said body comprising a plurality of parallel arranged boards extending approximately the length of the body, the alternately disposed boards constituting separate sets or series of boards, means connecting each set or series of boards whereby they may be moved in unison as a set or series, cross-shafts arranged at or near the forward and rear ends of said boards, eccentrics connected with said shafts and with certain of the boards of each set or series to impart alternate up and down and longitudinal movement to said sets or series of boards, a driving means, means for operating one cross-shaft from said driving means, and gearing connecting said cross-shafts to operate one from the other and in timed relation with each other.

5. In a manure spreader, in combination with a vehicle body, of a feeding means including a plurality of longitudinally disposed boards arranged side by side, alternate boards constituting one of a set or series of boards, means for moving each set or series of boards alternately to the other set or series of boards, and an endless feeder embracing said sets or series of boards and moved by contact of the sets or series of boards therewith.

6. In a manure spreader, in combination with a vehicle body provided with scattering means at the scattering end thereof, of a feeding means including a plurality of longitudinally disposed boards arranged side by side, alternate boards constituting one of a set or series of boards, means for moving each set or series of boards alternately to the other set or series of boards, and an endless feeder embracing said sets or series of boards and moved by contact of the sets or series of boards therewith.

7. In a manure spreader, in combination with a vehicle body, of a feeding means including a plurality of longitudinally disposed boards arranged side by side to support the load, alternate boards constituting one of a set or series of boards, a driving means, eccentric mechanism constituting a mounting and the operating means for said sets or series of boards and located near the front and rear ends thereof, operating connections between said eccentric mechanism and said driving means, and an endless feeder embracing said sets or series of boards and moved by contact of the sets or series of boards therewith.

In witness whereof, I have hereunto affixed my hand this 10th day of March, 1922.

JAMES G. BAILEY.

Certificate of Correction.

It is hereby certified that the assignee in Letters Patent No. 1,452,139, granted April 17, 1923, upon the application of James G. Bailey, of Delavan, Illinois, for an improvement in "Manure Spreaders," was erroneously described and specified as "Rotary Spreader, of Mason City, Illinois, a Corporation of Illinois," whereas said assignee should have been described and specified as *Rotary Spreader Company, of Mason City, Illinois, a Corporation of Illinois*, as shown by the records of assignments in this office; and that the said Letters Patent should be read with this correction therein that the same may conform to the record of the case in the Patent Office.

Signed and sealed this 5th day of June, A. D., 1923.

[SEAL.]

KARL FENNING,
*Acting Commissioner of Patents.*